United States Patent
Tajima

(10) Patent No.: US 6,615,178 B1
(45) Date of Patent: Sep. 2, 2003

(54) SPEECH TRANSLATOR, SPEECH TRANSLATING METHOD, AND RECORDED MEDIUM ON WHICH SPEECH TRANSLATION CONTROL PROGRAM IS RECORDED

(75) Inventor: Kazuhiko Tajima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/673,470

(22) PCT Filed: Feb. 17, 2000

(86) PCT No.: PCT/JP00/00905
§ 371 (c)(1),
(2), (4) Date: Oct. 17, 2000

(87) PCT Pub. No.: WO00/49599
PCT Pub. Date: Aug. 24, 2000

(30) Foreign Application Priority Data

Feb. 19, 1999 (JP) .......................................... 11-041452

(51) Int. Cl.$^7$ .............................................. G10L 15/22
(52) U.S. Cl. .............................. 704/277; 704/2; 704/10; 704/9; 704/257
(58) Field of Search ............................. 704/277, 257, 704/270, 2, 9, 10

(56) References Cited

U.S. PATENT DOCUMENTS

| | | | | |
|---|---|---|---|---|
| 5,748,841 A | * | 5/1998 | Morin et al. ................ | 704/257 |
| 5,768,603 A | * | 6/1998 | Brown et al. ................ | 704/277 |
| 6,192,332 B1 | * | 2/2001 | Golding ....................... | 704/277 |
| 6,233,561 B1 | * | 5/2001 | Junqua et al. .............. | 704/277 |

OTHER PUBLICATIONS

Japanese Society for Artificial Intelligence, 17$^{th}$ Workshop Materials of language speech understanding and interactive processing, SIG–SLUD–9603–2, Yumi Wakita et al., Correct Parts Extraction From Speech Recognition Results Using Semantic Distance Calculation, and Its Application to Speech Translation, pp. 7–12, Jan. 24, 1997.

Japanese Society for Artificial Intelligence 2$^{nd}$ Workshop Materials of language speech understanding and interactive processing, SIG–SLUD–9202–13, Shoichi Matsunaga et al., "Statistical Language Model Adaptation for Speech Recognition", pp. 117–121, Jul. 13, 1992.

Research Report of Information Processing Society of Japan [Information Processing of Spoken Language] vol. 98, No. 49, 98–SLP–21–4, Satoshi Kaki et al., "A Method for Correcting Errors in Speech Recognition Using the Statistical Features of Character Co–occurrence"), pp. 47–54, May 28, 1998.

Proceedings of the Conference, 36$^{th}$ Annual Meeting of the Association for Computational Linguistics, vol. 1, Satoshi Kaki et al., "A Method for Correcting Errors in Speech Recognition Using the Statistical Features of Character Co–occurrence", pp. 653–657, 1998.

* cited by examiner

Primary Examiner—David D. Knepper
(74) Attorney, Agent, or Firm—Frommer Lawrence & Haug LLP; William S. Frommer

(57) ABSTRACT

The learning history memory 9 controls, based on the accumulated learning history, the word dictionary memory 6, semantic/syntactic analysis grammar memory 7, and a correction information memory 13 to limit the syntactic/semantic language structure and range of vocabulary, which are not used frequently. Then, the speech recognition collator 4 collates the feature vector with information, having high priority within the limited range, in the word dictionary memory 6 and semantic/syntactic analysis grammar memory 7 to recognize the speech.

15 Claims, 2 Drawing Sheets

SPEECH TRANSLATOR, SPEECH TRANSLATING METHOD, AND RECORDED MEDIUM ON WHICH SPEECH TRANSLATION CONTROL PROGRAM IS RECORDED

TECHNICAL FIELD

The present invention relates to an apparatus and method for translating a speech input in one language into a sentence in other language, and a recording medium having recorded therein a speech translation controlling program.

BACKGROUND ART

Nowadays, as the speech recognition technics have made remarkable advances, apparatuses for translating a recognized speech in one language into a sentence in other language have been developed. For a variety of users, the speech translating apparatus generally uses a recognition engine oriented for every user.

FIG. 1 shows a conventional speech translator 100. As shown, the speech translator 100 includes an input unit 102 which is a microphone for example, a feature extractor 103 to extract features of a speech from the input unit 102, a speech recognition collator 104, an acoustic model memory 105 to store acoustic models which represent phoneme, etc., a word dictionary memory 106 to store a word dictionary which represents correspondences between words and acoustic models, and a grammar memory 107 to store grammar which represents word conjunctions (generally stochastic language models).

The input unit 102 converts a supplied speech into a speech signal, digitizes the speech signal, and then supplies the digitized speech signal to the feature extractor 103. The feature extractor 103 calculates a string of feature vectors from the digitized speech signal, and supplies the feature vector string to the speech recognition collator 104.

The speech recognition collator 104 uses the feature vector, the acoustic models stored in the acoustic model memory 105, the word dictionary stored in the word dictionary memory 106 and the grammar stored in the grammar memory 107 to recognize a word string uttered.

The speech translator 100 further includes a translation block 108 which is supplied with a collation result from the speech recognition collator 104, a conversion information memory 109, a sentence corrector 110, a correction information memory 111 to store correction rule information for use to correct an incorrect sentence, a grammar information memory 112 to store information on example sentence substitution and a result display unit 113 which is a CRT (Cathode-Ray Tube) or a LCD (Liquid Crystal Display) for example.

The translation block 108 roughly translates the collation result by means of the conversion information memory 109 which stores many example sentence information, and supplies the translation result to the sentence corrector 110. The sentence corrector 110 corrects in detail the translation result from the translation block 108 by the use of the information stored in the correction information memory 111 and grammar information memory 112.

The result display unit 113 displays the correction result from the sentence corrector 110 as the translation of the supplied speech.

Because of the recognition engine being oriented for unspecified utterers, the speech translator 100 can advantageously be used by any users, while it has difficulty in discriminating for each specified utterer the utterance manner, range of vocabulary and utter's habit which would be constant. Thus, the speech translator 100 has to process even unnecessary speech recognition, since it does not perform speech recognition processing for each utterer.

Also, the speech translator 100 cannot optimize the interaction between the user as an utterer and the translator itself, since it has no user-adaptability or has not any means for saving the utilization frequency and tendency of each user. Thus, the speech translator 100 is likely to incur errors which would not otherwise take place. Furthermore, since the speech translator 100 cannot identify the preference or utilization mode of each user, it does not suit each user at all.

DISCLOSURE OF THE INVENTION

Accordingly the present invention has an object to overcome the above-mentioned drawbacks of the prior art by providing a speech translating apparatus and method, which work at a higher speed and enable optimum interactions between the user and the translator itself, and a recording medium having recorded therein a speech translation controlling program.

The above object can be attained by providing a speech translating apparatus including:
  means for extracting features of a supplied speech to provide a feature vector;
  means for collating the feature vector from the feature extracting means with a plurality of collation information for speech recognition to recognize the speech and providing a sentence indicative of the recognized speech;
  means for translating the sentence indicative of the speech recognized by the speech recognition collating means into a sentence in a language different from that of the supplied speech;
  means for correcting the sentence translated by the translation processing means by the use of optimum one of a plurality of correction information;
  means for outputting the correction result of the sentence correction means;
  means for accumulating history information indicative of the tendency of the sentence recognized by the speech recognition collating means; and
  a cumulative learning means for comparing the speech recognition result with the history information accumulated in the history information accumulating means each time the speech recognition collating means outputs the speech recognition result to update the history information accumulated in the history information accumulating means by a cumulative learning function;
  the history information accumulating means controlling, based on the accumulated history information, the selection of the collation information for use by the speech recognition collating means and/or selection of the correction information for use by the sentence correction means.

In the speech translating apparatus, history information indicative of the tendency of the sentence recognized by the speech recognition collating means is accumulated, and the speech recognition result is compared with the history information accumulated in the history information accumulating means each time the speech recognition collating means outputs the speech recognition result to update the history information accumulated in the history information accumulating means by a cumulative learning function. The history information accumulating means controls, based on the accumulated history information, the selection of the collation information for use by the speech recognition collating means and/or selection of the correction information for use by the sentence correction means. Thus, since the AI (artificial intelligence) cumulative learning function is used to select collation information for the speech translation and correction information for the correction of translated sentence, the speech translation can be done at an improved speed and with an improved performance and can also be optimized for each user.

Also the above object can be attained by providing a speech translating method including the steps of:
- extracting features of a supplied speech to generate a feature vector;
- collating the generated feature vector with a plurality of collation information for speech recognition to recognize the speech;
- translating the sentence recognized by the speech recognition into a sentence in a language different from that of the supplied speech;
- correcting the translated sentence by the use of optimum one of a plurality of correction information;
- comparing the speech recognition result with the history information indicative of the tendency of the speech-recognized sentence at each speech recognition to update the history information by a cumulative learning function;
- controlling, based on the updated history information, the selection of the collation information used for the speech recognition and/or selection of the correction information used for the sentence correction; and
- outputting the sentence corrected by the sentence correction.

In the speech translating method, the speech recognition result is compared with the history information indicative of the tendency of the speech-recognized sentence at each speech recognition to update the history information by a cumulative learning function, and, based on the updated history information, the selection of the collation information used for the speech recognition and/or selection of the correction information used for the sentence correction are controlled. Thus, since the AI (artificial intelligence) cumulative learning function is used to control the selection of the collation information used for the speech translation and selection of the correction information used for the translated-sentence correction, the speech translation can be done at a high speed and with a high performance, whereby the adaptability of the speech translation can be optimized for each user.

Also the above object can be attained by providing a recording medium having recorded therein a speech translation controlling program which:
- extracts features of a supplied speech to generate a feature vector;
- collates the generated feature vector with a plurality of collation information for speech recognition to recognize the speech;
- translates the sentence recognized by the speech recognition into a sentence in a language different from that of the supplied speech;
- corrects the translated sentence by the use of optimum one of a plurality of correction information;
- compares the speech recognition result with the history information indicative of the tendency of the speech-recognized sentence at each speech recognition to update the history information by a cumulative learning function;
- controls, based on the updated history information, the selection of the collation information used for the speech recognition and/or selection of the correction information used for the sentence correction; and
- outputs the sentence corrected by the sentence correction.

With the recording medium having recorded therein a speech translation controlling program, the program is installed in a computer. The computer compares the speech recognition result with the history information indicative of the tendency of the speech-recognized sentence at each speech recognition to update the history information by a cumulative learning function, and controls, based on the updated history information, the selection of the collation information used for the speech recognition and/or selection of the correction information used for the sentence correction. Thus, since the AI (artificial intelligence) cumulative learning function is used to control the selection of the collation information used for the speech translation and selection of the correction information used for the translated-sentence correction, the speech translation can be done at a high speed and with a high performance, whereby the adaptability of the speech translation can be optimized for each user.

BEST MODE FOR CARRYING OUT THE INVENTION

The present invention will further be described below concerning the best modes for carrying out the present invention with reference to the accompanying drawings.

Figure 1:
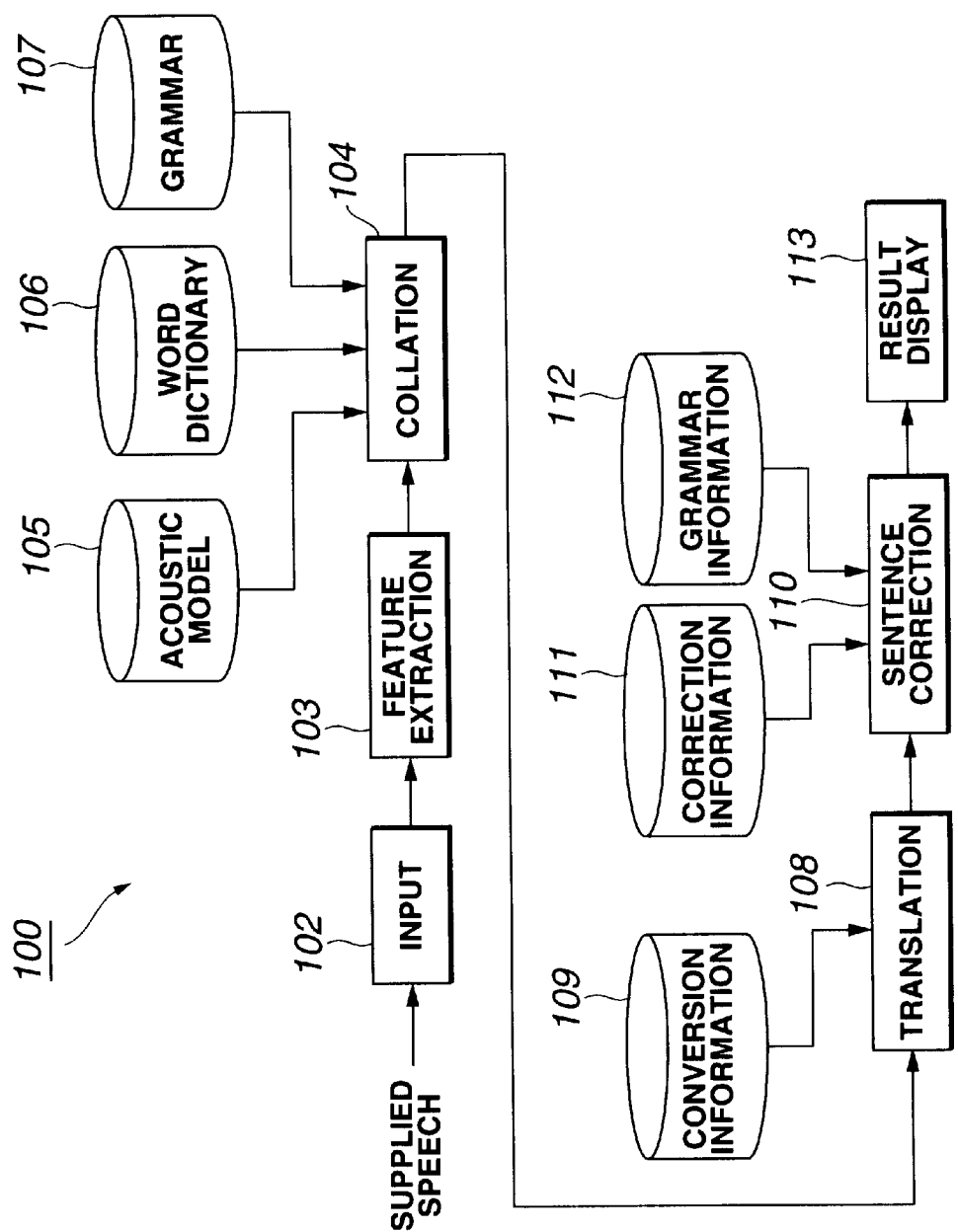
FIG. 1 is a block diagram of a conventional speech translating apparatus.
Figure 2:
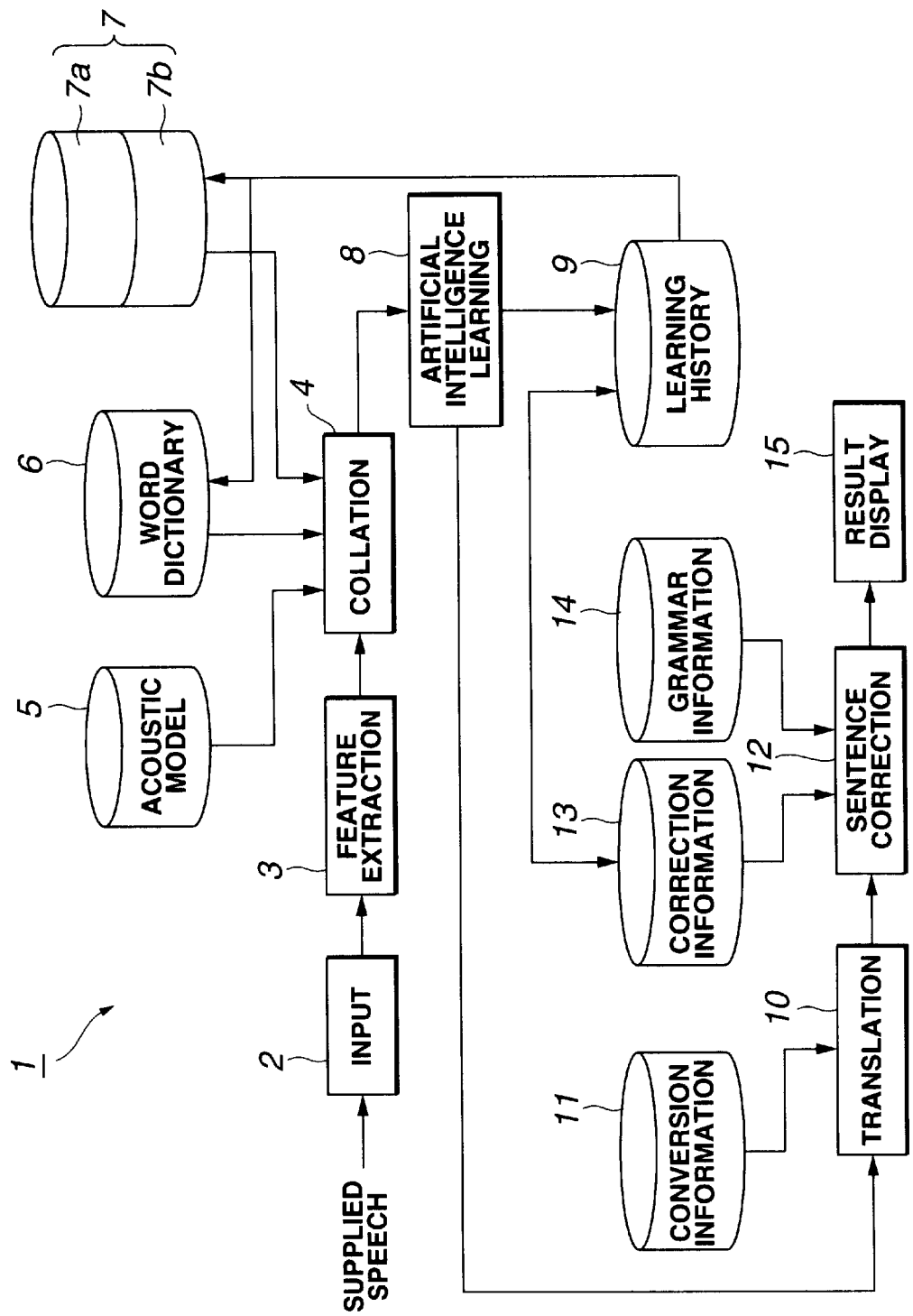
FIG. 2 is a block diagram of the speech translating apparatus according to the present invention.

The present invention is applicable to a speech translating apparatus shown in FIG. 2. The speech translating apparatus is referred hereinafter to as "speech translator" generally indicated with a reference number 1.

The speech translator 1 includes an input unit 2 to receive an input speech, a feature extractor 3 to extract features from the input speech, a speech recognition collator 4, an acoustic model memory 5 to store the HMM (Hidden Markov Model) model, a word dictionary memory 6 to store a word dictionary which represents correspondences between words and acoustic models, a semantic/syntactic analysis grammar memory 7 to store grammar which represents word conjunctions, an artificial intelligence (AI) learning unit 8 to cumulatively learn the recognized speech, and a learning history memory 9 to store learning history information.

The input unit 2 is a microphone, for example, which converts a supplied speech into a speech signal, digitizes the speech signal, and then supplies the digitized speech signal to the feature extractor 3.

The feature extractor 3 analyzes the frequency of the speech signal to provide a power spectrum of the speech signal. After taking a signal domain other than the speech domain as a noise domain to obtain a spectrum of the noise domain, the feature extractor 3 eliminates the noise spectrum from the speech domain. However, the parameter will have many dimensions if the power spectrum of the frequency analysis result is left as it is. To avoid this, the feature extractor 3 compresses the parameter to an appropriate dimension and time-serially extracts a feature vector as a feature value.

The speech recognition collator 4 collates the feature vector with information from the acoustic model memory 5, word dictionary memory 6 and semantic/syntactic analysis grammar memory 7 to recognize a word string uttered. The word dictionary memory 6 stores various word information such as noun, verb, conjunction, etc. The semantic/syntactic analysis grammar memory 7 consists of a stochastic language model block 7a and a rule-based (symbolic) grammar block 7b. Thus, the general-purpose language analysis theory such as Head-Driven Phrase Structure Grammar can be utilized to facilitate the speech recognition using the AI learning function.

That is, the speech recognition collator 4 collates the feature vector with the HMM model to recognize uttered words one by one, next, with the information from the word dictionary memory 6 to recognize each word, then, with the information from the semantic/syntactic analysis grammar memory 7 to recognize a syntax, thereby recognizing the supplied speech as a sentence and outputting the speech recognition result. At this time, the speech recognition collator 4 selects, for recognition, a plurality of candidate ones from information stored in the acoustic model memory 5, word dictionary memory 6, and semantic/syntactic analysis grammar memory 7 to supply the recognition result to the AI learning unit 8.

The AI learning unit 8 has a cumulative learning function as disclosed in "S. Russell & Norvig: Artificial Intelligence; A Modern Approach, Parentice Hall, 1995". Improving each information (or its weight) learned from the history information including accumulated learning agents, the AI learning unit 8 accurately infers user's favorite information, etc. in a inductive logical manner.

As pointed out in "P. Langley: Machine learning for Adaptive User Interface, (Proceeding of the 21st German Annual Conference on Artificial Intelligence, pp. 53–62, Freiburg, Germany: Springer. 1997", the existing system-user adaptation (adaptive user interface) is a macro adaptation to almost all general users, and there exists almost no adaption to the preference, knowledge, experience, intention, etc. of each user. However, the above-described AI learning unit 8 has a function with which the system itself can learn and adapt based on the user's reaction and manner of usage, but not with any system adjustment by the user, to implement a most optimum system for the individual user's intention of using the system.

The user's preference referred to herein includes a syntactic/semantic utterance manner, range and using frequency of vocabulary, the utter's habit, etc of an utterer as a user. The AI learning unit 8 classifies the user's preference into the acoustic models, word dictionary, semantic/syntactic analysis grammar, then indexes them based on their statistical priority and stores them in the learning history memory 9. Specifically, the AI learning unit 8 counts how many times the same access has been made to the learning history information accumulated in the learning history memory 9, weights the learning history information and excludes low-weighted items. The knowledge thus processed is updated each time the user uses the system and the "facility" is also improved.

The AI learning unit 8 has both the learning functions "Informative User Interface" and "Generative User Interface" as disclosed in the above-mentioned Langley's article. The "Informative User Interface" is a function with which the system can select or filter the information as a response to provide the user with only ones of the system responses the user is interested in or useful for the user. Different from the above function of filtering the information, the user is interested in and useful for the user, the "Generative User Interface" is a function to generate, by the cumulative learning, a new knowledge structure which meets the user's intended use. Those functions work cooperatively to optimize the interactions between the utterer and translator.

Specifically, "Generative User Interface" is highly adaptable to the utterer's manner of usage, and so it functions to change the operation, oriented to unspecified utters, of the speech recognition unit of the translator to a one oriented for specified utterers to lessen the operations for the speech recognition. As a result of the cumulative learning, the system newly produces language models oriented for any utterers, which is the above-described knowledge structure. In the "Informative User Interface", the user adaptability of the speech translator (for example, information known to a user does not need to be translated in detail) is a function with which the system selects or filters the information as a response to provide the user with the information the user is interested in or useful for the user.

The learning history memory 9 controls, based on the accumulated learning history, the word dictionary memory 6, semantic/syntactic analysis grammar memory 7, and a correction information memory 13 which will further be described later to limit the syntactic/semantic language structure and range of vocabulary, which are not used frequently.

Then, the speech recognition collator 4 collates the feature vector with information, having high priority within the limited range, in the word dictionary memory 6 and semantic/syntactic analysis grammar memory 7 to recognize the speech.

Thus, a "user model" which suits each user is organized to narrow the domain of a speech to be recognized, thereby improving the performance and processing speed of the system.

The learning history memory 9 has a reset function to erase the accumulated learning history information when the function is activated, thereby accumulating the result of a new speech recognition as a new history information.

The speech translator 1 further includes a translation block 10 for translating the speech recognition result from the speech recognition collator 4 into a predetermined language, a conversion information memory 11 having example sentence information stored therein, a sentence corrector 12 for correcting a translated sentence, a correction information memory 13 having stored therein information for use to correct a sentence to produce a detailed sentence, a grammar information memory 14 having grammar information stored therein, and a result display unit 15 for presenting a correctly translated sentence to the user.

The translation block 10 roughly translates the speech recognition result using many example sentence information stored in the conversion information memory 11 and supplies the translation result to the sentence corrector 12.

The sentence corrector 12 corrects the rough translation to produce a detailed and correct sentence based on the correction information stored in the correction information memory 13, and also corrects the translation result elaborately using grammatical error correcting information stored in the grammar information memory 14.

The correction information stored in the correction information memory 13 is influenced by the information having been accumulated in the semantic/syntactic analysis grammar memory 7 by access to the learning history memory 9. That is, the learning history memory 9 determines that, of the history information related to the semantic/syntactic analysis grammar memory 7, repeatedly used semantics and syntax does not need to be translated in detail, and controls the correction information memory 13 not to translate such semantics and syntax so elaborately to optimize the translating operations.

The sentence corrector 12 will not correct in detail the repeatedly used semantics and syntax. Thus, when the user utters sentences of the same contents repeatedly, the repeated parts of the sentences will not be translated in detail, whereby the translated sentences are prevented from being redundant.

The result display unit 15 is a CRT (Cathode-Ray Tube) or an LCD (Liquid Crystal Display), for example, which displays, as a sentence or the like, the translation result from the sentence corrector 12. Thus, the user can visually understand the translated sentence.

As in the above, the speech translator 1 reduces the object domain based on individual's information such as user's preference. Thus, the system can work with an improved performance and at an improved speed to optimize the interactions between the user and system.

Also, owing to the AI learning unit 8 provided, the speech translator 1 can learn the syntactic/semantic utterance manner, range and usage frequency of vocabulary of each user, and so it can recognize a speech at a higher speed.

Further, the learning history information having been stored in the learning history memory 9 by the cumulative learning function can be cleared using the reset function. Thus, another user of the system can have a speech translated by the system. That is, the system can be used in either of the speech translation modes for unspecified and specified users, whichever is advantageously suitable for a present user.

In the foregoing, the result display unit 15 is a CRT or an LCD, for example. However, the present invention is not limited to such a device but the result display unit 15 may be a speaker, for example, which outputs a translated language as a sound, or a transmission circuit which transmits a transmitted result to outside.

Furthermore, the above-mentioned speech-translating operations can be done by a computer by installing the speech translation controlling program for the operations, provided as recorded in a recording medium, into the computer.

As has been described in the foregoing, the speech translating apparatus and method, and the recording medium having recorded therein a speech translation controlling program according to the present invention compares the speech recognition result with the history information indicative of the tendency of the speech-recognized sentence at each speech recognition to update the history information by a cumulative learning function, controls, based on the updated history information, the selection of the collation information used for the speech recognition and/or selection of the correction information used for the sentence correction, and outputs the sentence corrected by the sentence correction. Thus, the system can work at a higher speed, whereby interactions between the user and the translator can be optimized.

What is claimed is:

1. A speech translating apparatus comprising:
   means for extracting features of a supplied speech to provide a feature vector;
   means for collating the feature vector from the feature extracting means with a plurality of collation information for speech recognition to recognize the speech and providing a sentence indicative of the recognized speech;
   means for translating the sentence indicative of the speech recognized by the speech recognition collating means into a sentence in a language different from that of the supplied speech;
   means for correcting the sentence translated by the translation processing means by the use of optimum one of a plurality of correction information;
   means for outputting the correction result of the sentence correction means;
   means for accumulating history information indicative of the tendency of the sentence recognized by the speech recognition collating means; and
   a cumulative learning means for comparing the speech recognition result with the history information accumulated in the history information accumulating means each time the speech recognition collating means outputs the speech recognition result to update the history information accumulated in the history information accumulating means by a cumulative learning function;
   the history information accumulating means controlling, based on the accumulated history information, the selection of the collation information for use by the speech recognition collating means and/or selection of the correction information for use by the sentence correction means.

2. The speech translating apparatus as set forth in claim 1, wherein the speech recognition collating means collates the feature vector from the feature extracting means with each of the collation information consisting of acoustic models, word information and semantic/syntactic analysis grammar information to recognize the speech.

3. The speech translating apparatus as set forth in claim 2, wherein the cumulative learning means selects the correction information for use by the sentence correction means such that, of the history information related to the semantic/syntactic analysis grammar information accumulated in the history information accumulating means, frequently used ones will not be corrected in detail.

4. The speech translating apparatus as set forth in claim 1, wherein the history information accumulating means accumulates history information consisting of usage frequency and/or utterance tendency of the supplied speech from an utterer.

5. The speech translating apparatus as set forth in claim 1, wherein the history information accumulating means erases the accumulated history information by resetting and accumulates the recognition result of the speech recognition collating means as new history information.

6. A speech translating method comprising the steps of:
   extracting features of a supplied speech to generate a feature vector;
   collating the generated feature vector with a plurality of collation information for speech recognition to recognize the speech;
   translating the sentence recognized by the speech recognition into a sentence in a language different from that of the supplied speech;
   correcting the translated sentence by the use of optimum one of a plurality of correction information;
   comparing the speech recognition result with the history information indicative of the tendency of the speech-recognized sentence at each speech recognition to update the history information by a cumulative learning function;

controlling, based on the updated history information, the selection of the collation information used for the speech recognition and/or selection of the correction information used for the sentence correction; and outputting the sentence corrected by the sentence correction.

7. The speech translating method as set forth in claim 6, wherein the generated feature vector is collated with each of the collation information consisting of acoustic models, word information and semantic/syntactic analysis grammar information to recognize the speech.

8. The speech translating method as set forth in claim 7, wherein the correction information for the sentence correction is selected such that, of the history information related to the semantic/syntactic analysis grammar information, frequently used ones will not be corrected in detail.

9. The speech translating method as set forth in claim 6, wherein at each speech recognition, the speech recognition result is compared with history information consisting of usage frequency and/or utterance tendency of the supplied speech from an utterer to update the history information by a cumulative learning function.

10. The speech translating method as set forth in claim 6, wherein the accumulated history information is erased by resetting and the recognition result of the speech recognition is accumulated as new history information.

11. A recording medium having recorded therein a speech translation controlling program which:

extracts features of a supplied speech to generate a feature vector;

collates the generated feature vector with a plurality of collation information for speech recognition to recognize the speech;

translates the sentence recognized by the speech recognition into a sentence in a language different from that of the supplied speech;

corrects the translated sentence by the use of optimum one of a plurality of correction information;

compares the speech recognition result with the history information indicative of the tendency of the speech-recognized sentence at each speech recognition to update the history information by a cumulative learning function;

controls, based on the updated history information, the selection of the collation information used for the speech recognition and/or selection of the correction information used for the sentence correction; and outputs the sentence corrected by the sentence correction.

12. The recording medium as set forth in claim 11, wherein the generated feature vector is collated with each of the collation information consisting of acoustic models, word information and semantic/syntactic analysis grammar information to recognize the speech.

13. The recording medium as set forth in claim 12, wherein the correction information for the sentence correction is selected such that, of the history information related to the semantic/syntactic analysis grammar information, frequently used ones will not be corrected in detail.

14. The recording medium as set forth in claim 11, wherein at each speech recognition, the speech recognition result is compared with history information consisting of usage frequency and/or utterance tendency of the supplied speech from an utterer to update the history information by a cumulative learning function.

15. The recording medium as set forth in claim 11, wherein the accumulated history information is erased by resetting and the recognition result of the speech recognition is accumulated as new history information.

* * * * *